No. 735,142. PATENTED AUG. 4, 1903.
G. PALMER.
METHOD OF MAKING HALF TONE PRINTING SURFACES.
APPLICATION FILED APR. 22, 1902.
NO MODEL.
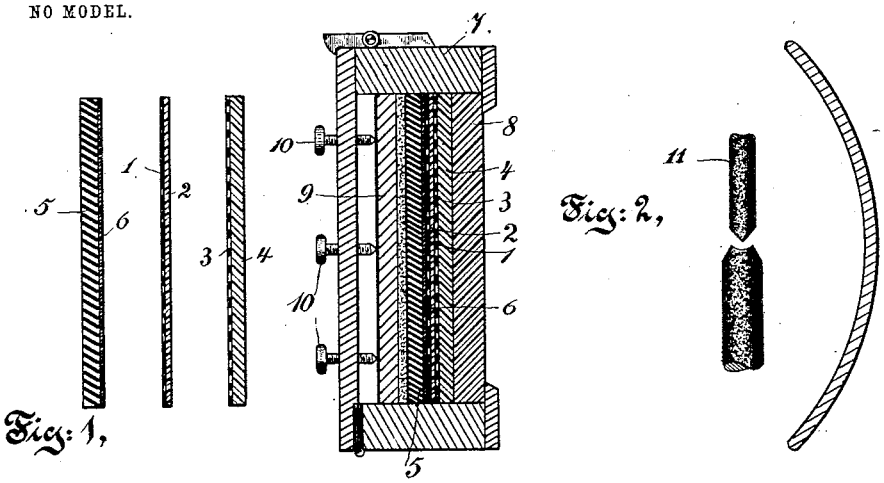
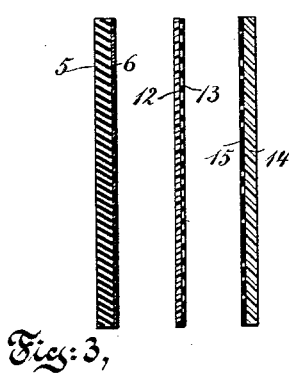
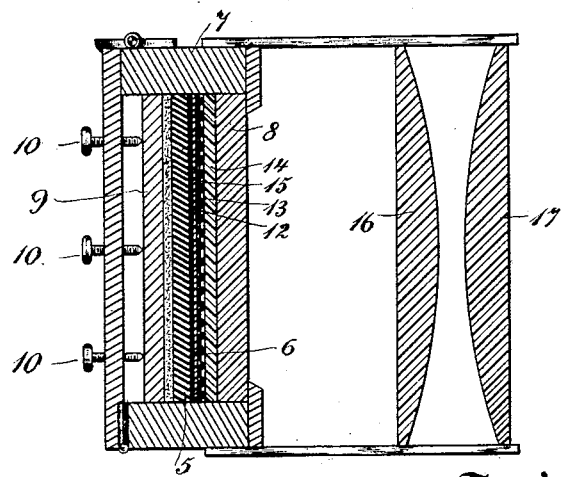
Witnesses: Inventor: George Palmer, by Kenyon & Kenyon Attorneys.

No. 735,142. Patented August 4, 1903.

UNITED STATES PATENT OFFICE.

GEORGE PALMER, OF BROOKLYN, NEW YORK, ASSIGNOR TO WILLIAM R. HEARST, OF NEW YORK, N. Y.

METHOD OF MAKING HALF-TONE PRINTING-SURFACES.

SPECIFICATION forming part of Letters Patent No. 735,142, dated August 4, 1903.

Application filed April 22, 1902. Serial No. 104,103. (No model.)

*To all whom it may concern:*

Be it known that I, GEORGE PALMER, a citizen of the United States, and a resident of Brooklyn, county of Kings, and State of New York, have invented new and useful Improvements in Methods of Making Half-Tone Printing-Surfaces, of which the following is a specification.

My invention relates to a method of making half-tone printing-surfaces.

In accordance with the common methods of producing half-tone printing-surfaces the subdivision of the picture or subject into minute elements as required to produce a surface which may be printed from by the ordinary methods of printing is effected in a negative photographic image of the subject. This negative, which is known in the art as a "half-tone" negative, is produced by exposing in a suitable camera a sensitized plate through a transparent screen having opaque lines ruled thereon in two directions, so as to form a multiplicity of minute openings for the admission of the light to the plate. The screen is separated from the sensitive plate by such a distance that the rays of light passing through the openings are enabled to affect areas of the plate which are larger than the openings in the screen. The size of the affected portions of the sensitive plate are greater or smaller, depending on the intensity of the light reflected from the various parts of the subject. Where the high lights of the subject occur, the affected portions of the sensitive plate encroach upon each other or "lock up," as it is called, so that when the plate is developed it will be opaque at the parts corresponding to the high lights, except for small transparent openings which correspond to the points on the screen where the opaque lines cross each other. When the sensitized surface from which the printing-surface is produced is exposed through the half-tone negative, the transparent openings in the latter produce small dots or elements which invariably appear in the high lights of the printed picture. Where the intermediate tones of the subject occur, the transparent openings in the negative are larger, and consequently the dots in the printed picture are larger. Where the heaviest shadows of the subject occur, the negative may be entirely transparent, in which case the picture will be solid black at those portions. With this process, however, the exposure of the half-tone negative cannot be carried so far as to completely close up those portions of the half-tone negative corresponding to the high lights, and thus eliminate the dots from those portions of the subject, for the reason that the intermediate tones would be proportionately affected, the details of the subject being thus so weakened as to render the result flat or ghostly in appearance. These half-tone negatives, moreover, require great care and skill in their production. In order to produce good results, a particular kind of sensitive plate has to be used, and it has to be exposed in a special camera mounted in a peculiar way in a studio which is especially fitted up for the work. In order, therefore to produce half-tone printing-surfaces by the old method from subjects which cannot be brought to or manipulated in the studio, three distinct steps are necessary—first, a special copy of the original, such as a drawing or a photograph, which may be mounted on a special support in the studio, is required; second, a half-tone negative has to be made from the copy, and, third, the printing-surface has to be produced from the half-tone negative. To produce by the old method complementary half-tone printing-surfaces suitable for multicolor-printing by the so-called "three-color" process, four distinct steps are required for the production of each printing-surface—first, a negative is made from the original by exposing a suitable sensitized plate through a suitable color-screen; second, a positive photographic print is made from this negative; third, a half-tone negative is made from this positive print, and, fourth, the printing-surface is produced from the half-tone negative. Where three complementary printing-surfaces are produced, twelve distinct steps are thus required.

My invention has for an object to provide a method whereby half-tone printing-surfaces may be produced directly from original photographic negatives of the subject and without the use of half-tone negatives and without the special devices and apparatus indispensable to the use of such negatives.

My invention has for an object also to provide a method of producing half-tone printing-surfaces whereby the printing of the dots or elements may be entirely omitted in the high lights without reducing the strength of or otherwise affecting the elements in the other parts of the picture.

A further important object of my invention is to provide a method whereby complementary printing-surfaces suitable for printing by the so-called "three-color" process can be produced directly from the negatives made from the original with the usual color-screens, two steps instead of four being required for the production of each of the complementary printing-surfaces.

These and other objects of my invention will more fully appear from the following description.

I have found that when a suitable sensitized surface is exposed to the action of light through a plain negative of the subject to be reproduced and a half-tone screen, the latter being suitably separated from the sensitized surface, an excellent printing-surface may be directly produced from the sensitized surface. The negative of the subject may be either a wet-plate negative produced in a special camera in the studio or it may be a dry-plate negative exposed in an ordinary camera and wherever the subject may be found. The ordinary half-tone screen may be used; but where it is exposed directly to the action of diffused light, as in ordinary photographic printing, it must not be separated as great a distance from the sensitized surface as the half-tone screens are separated from the sensitized surface in producing ordinary half-tone negatives. I have found, however, that by making the exposure through the form of lens known as a "condenser" the amount of separation between the half-tone screen and the sensitized surface may be somewhat greater than where the exposure is made by diffused light, but still not nearly so great as is required for producing a half-tone negative in a camera.

In accordance with my process the photographic image in which the subdivision of the subject into minute elements is effected is a positive image, whereas in the old process the subdivision is effected in a negative image. In my process the portions of the image which correspond to the high lights of the subject are the least affected by light, whereas in the old process those portions of the image are the most affected by light. The result of this is that in my process the portions of the image which correspond to the high lights of the subject can be varied in intensity through wide limits without affecting the intensity of the other parts of the subject. In the old process no attempt to vary the intensity of the portions of the image corresponding to the high lights would produce equal or even greater variations in the other portions of the negative. So perfect is the control of the photographic image in which the subdivision of the subject takes place in my process that by suitably intensifying the negative and by controlling the exposure of the sensitized plate the high lights of the subject may be entirely eliminated from the printing-surface, there being produced in the printing-surface at the same time strong intermediate tones and solid blacks. This result is contributed to also by the fact that the development of the sensitized surface from which the printing-surface is to be produced can be varied within wider limits than can the development of sensitized surfaces which have been exposed through the ordinary half-tone negatives. The parts of these sensitized surfaces which correspond to the high lights of the subject having been exposed to the denser parts of the negative are less strongly affected by the light than are the other parts of the surfaces, and they may therefore be dissolved away in greater proportion than the other parts of the surfaces. Where the negative is sufficiently dense and the exposure has not been carried too far, the portions of the sensitive plates corresponding to the high plates may be entirely dissolved away, as above intimated, thus leaving the corresponding portions of the surface to be developed into a printing-surface entirely exposed to the action of the etching-bath or other developing medium. A printing-surface thus produced will have no printing elements where the high lights occur and the pictures will have pure high lights. In the old process the sensitized surface is exposed through portions of the half-tone negative which while they vary in size are of uniform density. All portions of the sensitized surface, therefore, which are affected by light are affected in like degree, and none of them can be removed in the developing process or substantially varied in size or strength without removing or proportionately varying all portions.

The accompanying drawings, which are referred to herein and form a part hereof, illustrate diagrammatically the various ways in which the negatives, screens, and sensitized surfaces may be manipulated in carrying my invention into effect.

Of the drawings, Figure 1 is a diagrammatic view illustrating the order in which the several elements may be associated for black or single-color printing. Fig. 2 is a sectional view illustrating the elements shown in Fig. 1 as assembled in a printing-frame for the purpose of making an exposure. Fig. 3 is a view similar to Fig. 1, illustrating how the parts may be associated to produce one of a series of complementary half-tone printing-surfaces for use in color-printing. Fig. 4 is a sectional view illustrating the elements shown in Fig. 3 as assembled in a printing-frame to make an exposure, and Fig. 5 is a diagrammatic view illustrating another way of associating the parts.

I have found that where the exposure of the sensitized surface from which the printing-surface is produced is to be made by diffused light the half-tone screen, having a mesh of, say, one hundred lines to the inch, must not be separated from the sensitized surface by a distance greater than, say, one-fiftieth of an inch. The best results have been produced by the separation of about one one-hundredth of an inch. A screen having a finer mesh must be separated a proportionately less distance. In order to get this small amount of separation and at the same time have the negative in contact with the sensitized surface during the exposure, a condition which has heretofore been deemed essential, I place the negative film 1 (represented by the heavy line in Fig. 1 of the drawings) on a thin transparent sheet 2, such as a sheet of collodion or celluloid, which has a thickness equal to the desired amount of separation between the half-tone screen and the sensitized surface. This may be accomplished either by forming the negative film directly on the thin sheet or by forming it on a glass plate, as usual, and then transferring it to the thin sheet. I then produce a half-tone screen the lines of which lie directly on the surface thereof. This is preferably done photographically by exposing a suitable sensitized surface through an ordinary half-tone screen in a camera and then developing the sensitized surface. Such a screen is represented in the drawings, in which dotted line 3 represents the film forming the screen, and 4 a suitable supporting-plate therefor.

5 represents a plate adapted to be developed into a printing-surface, and 6 is a sensitized coating thereon. To make an exposure, these parts are assembled in the relation shown in Fig. 1—that is to say, the negative film 1 is arranged next to the sensitive plate 6 and the screen-film 3 is arranged opposite the back of the sheet 2. The parts are then brought together and firmly pressed into a whole surface contact with each other in a suitable printing-frame, as shown in Fig. 2, in which 7 represents the frame, 8 a heavy glass plate through which the exposure is made, 9 a backing-board, and 10 a series of clamp-screws by which the required pressure is produced. The exposure may be made in the ordinary way, either by direct sunlight or by the light of a powerful lamp, (indicated at 11.)

While the relative arrangement of the parts just described is preferred where the printing-surface is to be used for black or single-color printing, it is not well adapted for producing complementary printing-surfaces for color-printing, for the reason that with the thin transparent sheets on which the negatives are formed accurately-registering printing-surfaces cannot be produced with certainty. This is especially true where the films are formed on glass plates and then transferred to the thin transparent sheets. Where it is desired to produce complementary printing-surfaces which will register with great accuracy in printing therefor, I prefer to proceed as follows:

The film forming the half-tone screen is formed on or transferred to a transparent sheet of celluloid or similar material which has a thickness corresponding to the amount of separation required between the half-tone screen and the sensitized surface.

12 in Fig. 3 indicates the transparent sheet, and 13 indicates the half-tone screen thereon. The negative is formed by the use of a color-screen in the ordinary way on a glass plate 14, the negative film being indicated by the heavy line 15. 5 is a plate adapted to be developed into a printing-surface, and 6 is the sensitized surface thereon. These parts are arranged as indicated in Fig. 3—that is to say, the screen 12 is placed on the plate 5 film side up, the negative 14 is placed on the screen film side down, and the parts are brought into whole surface contact in a suitable printing-frame, as shown in Fig. 4. With the parts thus assembled I have found that a perfect print of the negative on the sensitized surface can be produced by making the exposure through a suitable condenser. Such a condenser may be formed by a pair of plano-convex lenses 16 17, arranged with their convex surfaces toward each other, as shown. The exposure may be made by sunlight or by a suitable lamp 11, as indicated. While this arrangement of the parts is preferred, good results may be obtained by placing the negative 14 film side down directly upon the sensitized plate 5 and placing a suitable half-tone screen, such as the screen 4, Fig. 1, film side down on the back of the negative and making the exposure through a condenser, as shown in Fig. 5. It will be seen that by either of these latter methods the negatives which are made from the original and which are relied upon to secure the register are formed directly on the ordinary rigid glass plates and are kept on these plates throughout the entire process, so that there is no opportunity offered for them to become distorted or stretched, so as to destroy the register.

By the use of a condenser in making exposures the rays of light are maintained in parallel relation and are directed through the screen and negative in parallel lines which are at substantial right angles to the plane of the surfaces. This permits of the negative film being slightly separated from the sensitized surface without producing any evil effects, and it also permits of the half-tone screen being separated from the sensitized surface to a somewhat greater extent than is permissible if the exposure is made by diffused light.

It is obvious that the printing-surface may be of any desired character—that is, either relief, planographic, or intaglio—and that the sensitized surface from which the printing-surface is produced may be formed directly on a surface adapted to be developed into a printing-surface, or it may be formed upon any suitable surface and so developed that a print or transfer may be made to the surface which is to be developed into the printing-surface. For producing relief printing-surfaces I preferably form a sensitized gelatin film directly on the surface of a zinc sheet, which film after exposure may be developed by soaking away the portions of the gelatin which are unaffected or only weakly affected by the light and then etching the zinc surface into a relief-surface in the ordinary manner.

It is among the advantages of my invention that half-tone printing-surfaces may be produced directly from ordinary photographic negatives, thus doing away with the production of the troublesome half-tone negative.

A special advantage of my invention is that complementary half-tone printing-surfaces for color-printing may be produced directly from the negatives which are produced from the original by the color-screens. Two of the four steps which were required by the old method to produce each complementary printing-surface—to wit, the making of a positive from the first negative and the making of a half-tone from the positive—are therefore thus dispensed with. These complementary printing-surfaces produced by my method, moreover, do not require as much alteration by hand as do the complementary surfaces produced by the old method, as wherever the high lights occur in the original the corresponding parts of the printing-surfaces are easily eliminated by properly exposing and developing the sensitized surface from which the printing-surface is produced. All the other parts of the subject, moreover, which have to be removed by hand manipulation may be easily removed by simply stopping out the corresponding parts of the original negatives.

It will be seen that in its broader aspects my invention is not limited to the precise modes of procedure herein specifically described, as many changes may be made in the details of the procedure without departing from the main principles of the invention and without sacrificing its chief advantages.

Having thus described my invention, what I claim as new, and desire to secure by Letters Patent, is—

1. The method of making half-tone printing-surfaces which consists in exposing a suitable sensitized surface through a negative and a half-tone screen, the latter being suitably separated from the sensitized surface, and then producing a printing-surface of the character desired from said sensitized surface.

2. The method of making a half-tone printing-surface which consists in exposing a sensitized surface adapted to be developed into a printing-surface through a negative and a half-tone screen, the latter being suitably separated from the sensitized surface, then developing said sensitized surface, and then etching said surface to produce a relief printing-surface.

3. A method of making a half-tone printing-surface which consists in exposing a surface coated with a sensitized gelatin film through a photographic negative and a half-tone screen, the latter being suitably separated from said sensitized surface, then dissolving away the portions of the gelatin film which are unaffected or weakly affected by light, including the parts corresponding to the high lights of the original, and then producing a printing-surface of the character desired from the film thus developed.

4. A method of making a half-tone printing-surface which consists in exposing a surface coated with a sensitized gelatin film through a photographic negative and a half-tone screen, the latter being suitably separated from said sensitized surface, then dissolving away the portions of the gelatin film which are unaffected or weakly affected by light, including the parts corresponding to the high lights of the original, and then etching away the parts of the surface thus exposed to produce a relief printing-surface.

5. The method of making half-tone printing-surfaces which consists in exposing a suitable sensitized surface through a negative and a half-tone screen, the latter being arranged between the negative and the sensitized surface and suitably separated from the latter, then producing a printing-surface of the character desired from said sensitized surface.

6. The method of making half-tone printing-surfaces which consists in exposing to the action of rays of light substantially all of which are parallel to each other a suitable sensitized surface through a negative and a half-tone screen, the latter being arranged between the negative and the sensitized surface and suitably separated from the latter, then producing a printing-surface of the character desired from said sensitized surface.

7. The method of making half-tone printing-surfaces which consists in exposing a suitably-sensitized surface through a negative and a half-tone screen, the latter being arranged between the negative and the sensitized surface and suitably separated from the latter, and then developing said sensitized surface, and then etching said developed surface to produce a relief printing-surface.

8. The method of making half-tone printing-surfaces which consists in placing a thin transparent sheet having a half-tone screen in the form of a film on one side on a suitable sensitized surface film side up, placing a photographic negative on said screen, exposing said sensitized surface to light through the said negative and film, and then producing a printing-surface of the character desired from the sensitized surface.

9. The method of making half-tone printing-surfaces which consists in placing a thin transparent sheet having a half-tone screen in the form of a film on one side on a suitable sensitized surface, film side up, placing a photographic negative on said screen, exposing said sensitized surface to light through the said negative and film, then developing said sensitized surface and then producing a relief printing-surface from the developed surface.

10. The method of making half-tone printing-surfaces which consists in placing a thin transparent sheet having a half-tone screen in the form of a film on one side on a suitable sensitized surface film side up, placing a photographic negative film side down on said screen, exposing said sensitized surface to light through the said negative and film, and then producing a printing-surface of the character desired from the sensitized surface.

11. The method of making half-tone printing-surfaces which consists in placing a thin transparent sheet having a half-tone screen in form of a film on one side on a suitable sensitized surface film side up, placing a photographic negative on said screen, exposing said sensitized surface through the said negative and film to rays of light substantially all of which are parallel to each other, and then producing a printing-surface of the character desired from the sensitized surface.

12. The method of making half-tone printing-surfaces which consists in placing a thin transparent sheet having a half-tone screen in the form of a film on one side on a suitable sensitized surface film side up, placing a photographic negative film side down on said screen, exposing said sensitized surface through the said negative and film to rays of light substantially all of which are parallel to each other, and then producing a printing-surface of the character desired from the sensitized surface.

13. The method of making half-tone printing-surfaces which consists in placing a thin transparent sheet having a half-tone screen in the form of a film on one side on a suitable sensitized surface film side up, placing a photographic negative film side down on said screen, exposing said sensitized surface through the said negative and film to rays of light substantially all of which are parallel to each other, then developing said sensitized surface and then producing a relief printing-surface from the developed surface.

14. The method of making a half-tone printing-surface for color-printing, said method consisting in producing a negative photographic image from the original subject by means of a suitable color-screen, exposing a sensitized surface through said negative and a half-tone screen, the latter being suitably separated from said sensitized surface, and then producing a printing-surface of the character desired from said sensitized surface.

15. The method of making a half-tone printing-surface for color-printing, said method consisting in producing a negative photographic image from the original subject by means of a suitable color-screen, exposing a sensitized surface coated with a sensitized gelatin film through said negative and a half-tone screen, the latter being suitably separated from said sensitized surface, then dissolving away the portions of the gelatin film which are unaffected or weakly affected by light, including the portions corresponding to the high lights of the original, and then etching the surface thus exposed to produce a printing-surface of the character desired.

16. The method of making a half-tone printing-surface for color-printing, said method consisting in producing a negative photographic image from the original subject by means of a suitable color-screen, exposing a sensitized surface coated with a sensitized gelatin film through said negative and a half-tone screen, the latter being suitably separated from said sensitized surface, then dissolving away the portions of the gelatin film which are unaffected or weakly affected by light, including the portions corresponding to the high lights of the original, then etching away the portions of the surface thus exposed to produce a relief printing-surface.

17. The method of making a half-tone printing-surface for color-printing, said method consisting in producing a negative photographic image from the original subject by means of a suitable color-screen, exposing a suitable sensitized surface through said negative and a half-tone screen, the screen being arranged between the negative and the sensitized surface and suitably separated from the latter, and then producing a printing-surface of the character desired from said sensitized surface.

18. The method of making a half-tone printing-surface for color-printing, said method consisting in producing a negative photographic image from the original subject by means of a suitable color-screen, exposing a suitable sensitized surface through said negative and a half-tone screen to rays of light substantially all of which are parallel to each other, the screen being arranged between the negative and the sensitized surface and suitably separated from the latter, and then producing a printing-surface of the character desired from said sensitized surface.

19. The method of making a half-tone printing-surface for color-printing, said method consisting in producing a negative photographic image from the original subject by means of a suitable color-screen, exposing a surface having a sensitized gelatin film thereon through such negative and a half-tone screen, the screen being arranged between the negative and the sensitized surface and suitably separated from the latter, then dissolving away the portions of the gelatin film unaffected or weakly affected by light, including the portions corresponding to the high lights of the original, and then etching the portions of the surface thus exposed to produce a printing-surface of the character desired.

20. The method of making a half-tone printing-surface for color-printing, said method consisting in producing a negative photographic image from the original subject by means of a suitable color-screen, exposing a surface having a sensitized gelatin film thereon through such negative and a half-tone screen, the screen being arranged between the negative and the sensitized surface and suitably separated from the latter, then dissolving away the portions of the gelatin film unaffected or weakly affected by light, including the portions corresponding to the high lights of the original, and then etching away the portions of the surface thus exposed to produce a relief printing-surface.

21. The method of making a half-tone printing-surface for color-printing, said method consisting in producing a negative photographic image from the original subject by means of a suitable color-screen, placing a thin transparent sheet having a half-tone screen in the form of a film on one side film side down on the said negative, placing a sensitized surface on the back of the transparent sheet, exposing said sensitized surface to the action of light through said negative and film, and then producing a printing-surface of the character desired from said sensitized surface.

22. The method of making a half-tone printing-surface for color-printing, said method consisting in producing a negative photographic image from the original subject by means of a suitable color-screen, placing a thin transparent sheet having a half-tone screen in the form of a film on one side film side down on the said negative, placing a sensitized surface on the back of the transparent sheet, exposing said sensitized surface through said negative and film to rays of light substantially all of which are parallel to each other, and then producing a printing-surface of the character desired from said sensitized surface.

23. The method of making a half-tone printing-surface for color-printing, said method consisting in producing a negative photographic image from the original subject on a plate of glass by means of a suitable color-screen, placing a thin transparent sheet having a half-tone screen in the form of a film on one side of said negative film to film, placing a suitable sensitized surface on the back of said transparent sheet, and exposing said sensitized surface to the action of light through said negative and screen, and then producing a printing-surface of the character desired from said sensitized surface.

24. The method of making a half-tone printing-surface for color-printing, said method consisting in producing a negative photographic image from the original subject on a plate of glass by means of a suitable color-screen, placing a thin transparent sheet having a half-tone screen in the form of a film on one side of said negative film to film, placing a suitable sensitized surface on the back of said transparent sheet, and exposing said sensitized surface through the said negative and screen to rays of light substantially all of which are parallel to each other, and then producing a printing-surface of the character desired from said sensitized surface.

25. The method of making complementary half-tone printing-surfaces for color-printing, said method consisting in producing a plurality of negative photographic images from the original by means of suitable complementary color-screens, exposing each of a plurality of sensitized surfaces through one of said negatives and a half-tone screen, the latter being suitably separated from said sensitized surface, and then producing a printing-surface of the character desired upon each of said sensitized surfaces.

26. The method of making complementary half-tone printing-surfaces for color-printing, said method consisting in producing a plurality of negative photographic images from the original by means of suitable complementary color-screens, exposing each of a plurality of sensitized surfaces through one of said negatives and a half-tone screen, the screen being arranged between the negative and the sensitized surface and suitably separated from the latter, and then producing a printing-surface of the character desired from each of the said sensitized surfaces.

27. The method of making complementary half-tone printing-surfaces for color-printing, said method consisting in producing a plurality of negative photographic images from the original subject upon glass plates by means of suitable color-screens, exposing each of a plurality of sensitized surfaces through one of said negatives and a half-tone screen, the screen being arranged between the negative and the sensitized surface and suitably separated from the latter, and then producing a printing-surface of the character desired from each of the said sensitized surfaces.

28. The method of making complementary half-tone printing-surfaces for color-printing, said method consisting in producing a plurality of negative photographic images from the original subject on glass plates by means of suitable color-screens, placing a thin transparent sheet having a half-tone screen in the form of a film on one side thereof on each of said negatives film to film, placing a suitable sensitized surface on the back of said transparent sheets and exposing said sensitized surfaces to the action of light through said negatives and screens, and producing a printing-surface of the character desired from each of said sensitized surfaces.

29. The method of making complementary half-tone printing-surfaces for color-printing, said method consisting of producing a plurality of negative photographic images from the original subject upon glass plates by means of suitable color-screens, exposing each of a plurality of sensitized surfaces through said negative and a half-tone screen to rays of light substantially all of which are parallel to each other, the screen being arranged between the negative and the sensitized surface and suitably separated from the latter, and then producing a printing-surface of the character desired from each of the said sensitized surfaces.

30. The method of making complementary half-tone printing-surfaces for color-printing, said method consisting in producing a plurality of negative photographic images from the original subject on glass plates by means of suitable color-screens, placing a thin transparent sheet having a half-tone screen in the form of a film on one side thereof on each of said negatives film to film, placing a suitable sensitized surface on the back of said transparent sheets and exposing said sensitized surfaces through said negatives and screens to rays of light substantially all of which are parallel to each other, and producing a printing-surface of the character desired from each of said sensitized surfaces.

31. The method of making half-tone printing-surfaces which consists in exposing a suitably-sensitized surface through a negative and a cross-line screen, the latter being separated from the sensitized surface by a distance not greater than twice the distance between the lines of the screen, and then producing a printing-surface of the character desired, from said sensitized surface.

In testimony whereof I have signed my name to this specification in the presence of two subscribing witnesses.

GEORGE PALMER.

Witnesses:
  EDWIN SEGER,
  J. D. GEMPLER.